(12) United States Patent
Manke et al.

(10) Patent No.: US 9,714,589 B2
(45) Date of Patent: Jul. 25, 2017

(54) CRANKSHAFT FOR AN ALTERNATIVE COOLING COMPRESSOR

(75) Inventors: Adilson Luiz Manke, Joinville-SC (BR); Laerte Capestrini, Joinville-SC (BR)

(73) Assignee: Whirlpool S.A., Sao Paulo, Sp (BR)

( * ) Notice: Subject to any disclaimer, the term of this patent is extended or adjusted under 35 U.S.C. 154(b) by 228 days.

(21) Appl. No.: 13/992,078

(22) PCT Filed: Dec. 1, 2011

(86) PCT No.: PCT/BR2011/000452
§ 371 (c)(1),
(2), (4) Date: Aug. 27, 2013

(87) PCT Pub. No.: WO2012/075554
PCT Pub. Date: Jun. 14, 2012

(65) Prior Publication Data
US 2013/0336765 A1  Dec. 19, 2013

(30) Foreign Application Priority Data
Dec. 6, 2010  (BR) ...................... 1009161

(51) Int. Cl.
*F01M 11/02* (2006.01)
*F04B 39/02* (2006.01)
*F04B 39/00* (2006.01)
*F04B 39/12* (2006.01)
*F01M 1/06* (2006.01)

(52) U.S. Cl.
CPC ......... *F01M 11/02* (2013.01); *F04B 39/0094* (2013.01); *F04B 39/0253* (2013.01); *F04B 39/0261* (2013.01); *F04B 39/123* (2013.01); *F01M 2001/062* (2013.01)

(58) Field of Classification Search
CPC .............. F04B 39/0094; F04B 39/0238; F04B 39/0246; F04B 39/0253; F04B 39/0292; F01M 2001/062; F01M 2001/0269; F01M 11/02; F01M 2011/026
See application file for complete search history.

(56) References Cited

U.S. PATENT DOCUMENTS 1,967,001 A * 7/1934 Vorech et al. ................ 417/372
2,113,691 A * 4/1938 Heller .......................... 417/419
(Continued)

FOREIGN PATENT DOCUMENTS

WO     03/098044 A1    5/2002

OTHER PUBLICATIONS

International Search Report dated Mar. 1, 2012, pp. 1-2.

*Primary Examiner* — Minh Truong
(74) *Attorney, Agent, or Firm* — Harrington & Smith

(57) ABSTRACT

The present invention refers to a crankshaft (1) for an alternative compressor comprising a main shaft (21) connected to an eccentric pin (2) by means of a peripheral flange (3) containing a lubricating hole (24) extending through said eccentric pin (2) and through at least part of the body of main shaft (21), one of the edges of said hole (24) being on the cylindrical surface (2a) of said eccentric pin (2). With this type of hole, the present invention allows for the use of shafts having extremely low diameters (and, as result, with low viscous loss), even with high eccentricities, whereby an excellent capacity of oil pumping and mechanical strength is maintained.

2 Claims, 5 Drawing Sheets

(56) References Cited

U.S. PATENT DOCUMENTS

| | | | |
|---|---|---|---|
| 5,884,593 A * | 3/1999 | Immel et al. | 123/90.23 |
| 7,100,743 B2 * | 9/2006 | Park et al. | 184/6.16 |
| 8,978,826 B2 * | 3/2015 | Kim et al. | 184/6.16 |
| 2002/0050425 A1 * | 5/2002 | Iversen et al. | 184/6.16 |
| 2005/0115771 A1 * | 6/2005 | Shin | 184/6.16 |
| 2007/0025864 A1 | 2/2007 | Cho | |
| 2008/0145247 A1 | 6/2008 | Park | |
| 2009/0092504 A1 | 4/2009 | Akashi et al. | |
| 2012/0210972 A1 * | 8/2012 | Kasai et al. | 123/196 W |

* cited by examiner

CRANKSHAFT FOR AN ALTERNATIVE COOLING COMPRESSOR

FIELD OF THE INVENTION

The present invention refers to a crankshaft for reciprocating compressor having an improved lubricating hole.

BASIS FOR THE INVENTION

A compressor has the function of increasing the pressure of a determined fluid volume to a pressure required for carrying out a refrigeration cycle.

FIG. 1 schematically illustrates the main parts of a mechanical kit assembly of reciprocating cooling compressor, wherein a connecting rod/crank system is used to convert rotary movement of electric motor to reciprocating movement of a plunger.

Thus, FIG. 1 illustrates a main shaft (or shaft body) 1 connected to an eccentric pin 2 by means of flange 3. Eccentric pin 2 is connected by means of a connecting rod 4 to a plunger 5 that moves within cylinder 6a of a cylinder block 6. The assembly is driven by an electric motor 7, wherein an oil pump 8 secured to shaft 1 or rotor 7a of electric motor 7 feeds the assembly with lubricating oil 9.

Refrigeration industry is highly concerned with the performance of cooling compressors. In fact, many works and studies have been carried out to improve this performance, mainly those aiming at reducing mechanical losses of moving parts, such as those generated on radial bearings of a compressor.

Mechanical loss in radial bearings is generated by contact between surfaces of parts and viscous friction resulting from the presence of lubricating oil.

Losses caused by contact of surfaces of shaft and bearing follow the equation given below:

$$Pot = Fa \times \omega \times R, \text{ where } Fa = \mu \times N,$$

wherein
Pot=friction-generated potency;
Fa=friction force;
$\omega$=relative angular velocity;
R=shaft radius;
$\mu$=dynamic friction coefficient; and
N=normal force.

Viscous friction losses (from shearing of lubricating oil due to the movement between shaft and bearing) follow the equation below:

$$Pot : c \cdot tex f(\epsilon) \times (\eta \times \omega^2 \times R^3 \times L)/c$$

wherein
Pot=friction-generated potency;
$\omega$=relative velocity between surfaces;
$\eta$=oil viscosity;
R=shaft radius;
L=useful width of bearing.
c=radial clearance between surfaces; and
$\epsilon$=shaft/bearing eccentricity ratio To reduce these mechanical losses, solutions are known from the state the art, which involve altering the geometry of component parts to reduce friction. Among this type of solution, it can be mentioned the possibility of reducing the diameter of the shaft and eccentric pin.

As reduction in viscous loss is proportional to the cube of the shaft radius, reduction in bearing diameter is one of the most interesting alternatives to reduce mechanical loss in a bearing.

Nevertheless, there are some technical difficulties associated with this continuous reduction in diameter of the main shaft body and eccentric pin, such as:

a). Reduction in the inertial moment and, consequently, strength of the shaft reduces;

b) Reduction in the capacity of centrifugal pumping of the oil, as the reduction in the shaft diameter, causes reduction in maximum radius of oil centrifugation; and c) Reduction in the capacity of pumping oil in a transition region between shaft body and eccentric pin.

In order to decrease such difficulties associated with item (a), it is possible, for example, to manufacture a crankshaft from a material having higher mechanical strength, such as nodular cast iron or steel.

With regard to the difficulties associated with item (b) above, it is possible to overcome same by, for example, opting to resort to a solution suggested in U.S. Pat. No. 6,416,296 B1.

With regard to the difficulties associated with item (c) above, they are in fact a technical limitation in reducing diameters of the main shaft and eccentric pin, mainly when associated with elevated values of eccentricities of eccentric pin, because the space available for machining a lubrication hole (responsible for transferring oil between the shaft body and eccentric pin) is highly limited.

Shaft holes known in the art usually have two main configurations as shown in FIGS. 2 and 3.

In FIG. 2, the configuration comprises a hole 10 beginning on face 2a of a cylinder defining eccentric pin 2 and goes towards the center of the body of main shaft 1 until reaching a hole 11 transversal to geometric axis of shaft 1.

Such a configuration has a limitation with respect to oil pumping process, because to transfer the oil from the lubricating channel of the main shaft body to the eccentric pin, it is required that same is forced to flow towards the body center, in an opposite direction to the centrifugal force generated by shaft rotation. Thus, in said configuration, the oil volume transferred to eccentric pin is inversely proportional to the maximum radial depth "E" to which oil is forced against centrifugal force (depth of hole 11 in radial direction).

With regard to the configuration depicted in FIG. 3, a hole of eccentric pin 2 terminates into a position directly interlinking with lubricating channel 12 of main shaft body 1 (helical channel that defines a surface channel commonly used in part of the process for pumping oil from the compressor reservoir). This configuration, although eliminating said problem associated with the process for pumping oil in an opposite direction to centrifugal force, shows a better performance when the axial bearing is plain, which acts as a mechanical sealing thus avoiding that oil is totally expelled from the shaft when lubricating channel of the shaft body is not covered by a block radial bearing. That is, this configuration is effective when said axial bearing prevents or restricts leakage of oil that would be expelled from the shaft by centrifugal force of the action.

Although there are solutions using the solutions discussed above as basis for minor changes in a design, geometrical complexities of such holes and their processes increase when a combination of diameters of shaft and eccentric pin of values below 14 mm and eccentricities above 8.0 mm are used.

OBJECTS OF THE INVENTION

Therefore, one object of the present invention is to provide a cooling compressor crankshaft having a lubricating hole that allows for a significant reduction in the dimensions of the crankshaft without substantially restricting the eccentricity of eccentric pin and minimally restricting the oil volume pumped to eccentric pin and plunger.

SUMMARY OF THE INVENTION

The above-mentioned objects of the present invention are accomplished by means of a crankshaft for a cooling compressor which usually comprises a main shaft (or shaft body) connected to an eccentric pin and having a lubricating hole extending through said eccentric pin and through at least part of the main shaft body, wherein one of the lubricating hole end is on the cylindrical surface of the eccentric pin and the lubricating hole centerline is contained on a plane B-B which is parallel to, but does not contain, a geometric axis coincident to the centerline of the main shaft body, said plane (B-B) being angularly displaced by an angle (B) in relation to plane (P) defined by the centerlines of the main shaft body and a centerline of the eccentric pin, which configuration permits providing a lubricating hole with minimum restriction to oil pumping and suitable wall thicknesses. In a preferred embodiment of the invention, the main shaft and eccentric pin are connected by means of a peripheral flange which usually defines an axial bearing (and which also usually incorporates a counterweight mass). However, in an alternative embodiment of the present invention, the main shaft body is directly connected to the eccentric pin with no peripheral flange.

Further, in the preferred embodiment of the present invention, the other end of the lubricating hole is on the cylindrical shaft body surface. However, in an alternative embodiment, the other end of the lubricating hole is inside the shaft body, and a complementary hole connects this edge to the cylindrical shaft body surface. In another alternative embodiment, the other end of the lubricating hole is totally on the surface of the peripheral axial seat flange or on a region intermediate of the axial seat and cylindrical shaft body surface generating a groove in a portion of said surface.

Additionally, any of the solutions presented herein are also suitable for crankshafts in which an eccentric pin is disposed between two main bearings of a crankshaft.

DETAILED DESCRIPTION OF THE INVENTION

Figure 1:
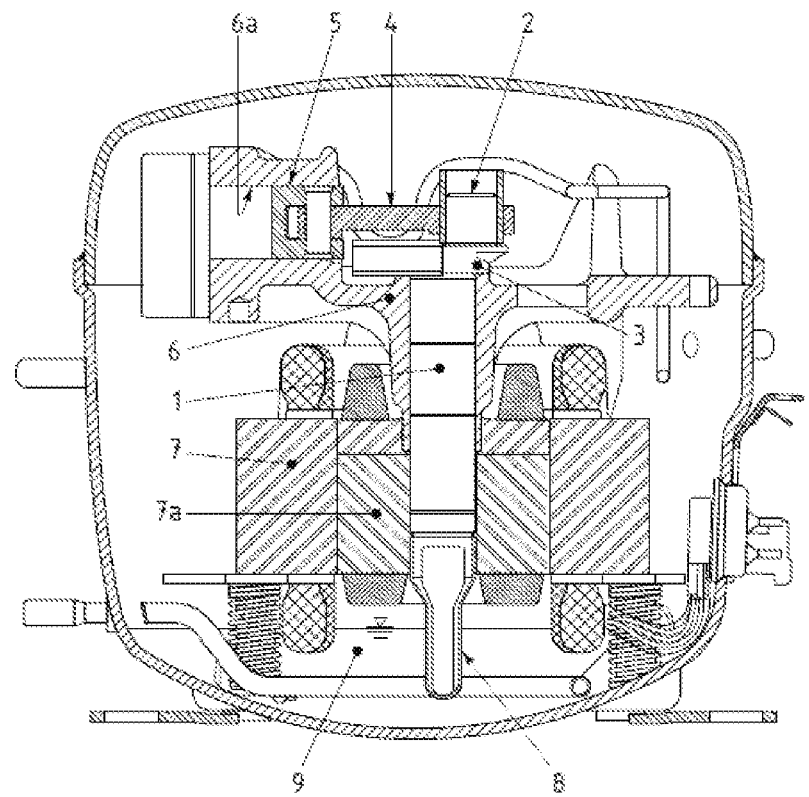
FIG. 1 illustrates a schematic view showing main parts of the mechanical kit assembly of a reciprocating cooling compressor, in accordance with the prior-art.
Figure 2:
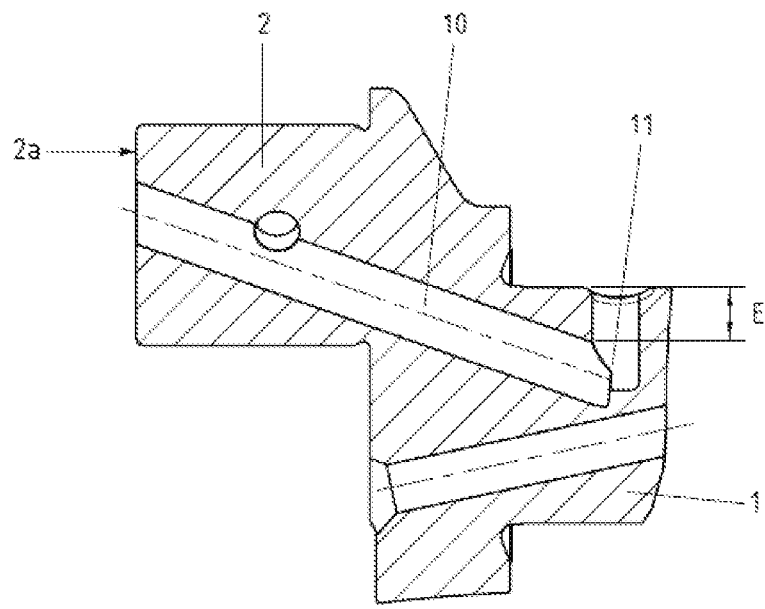
FIG. 2 illustrates a cut view of the end portion of a conventional compressor crankshaft at which an eccentric pin is disposed, in accordance with the prior-art.

Next, the present invention will be described in more details based on execution examples represented in the drawings. It is to be construed that the principles of the present invention can be applied to any type, size or configuration of a reciprocating compressor.

Figure 4:
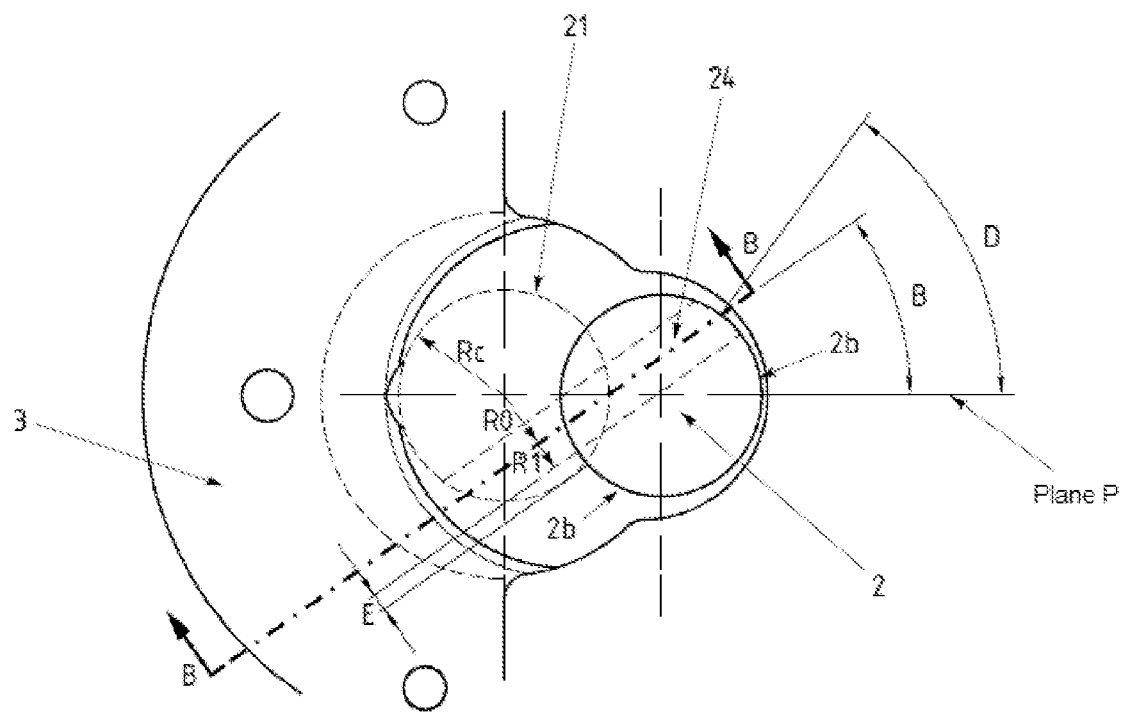
FIG. 4 illustrates a top view of a compressor crankshaft in accordance with a preferred embodiment of the present invention.
Figure 5:
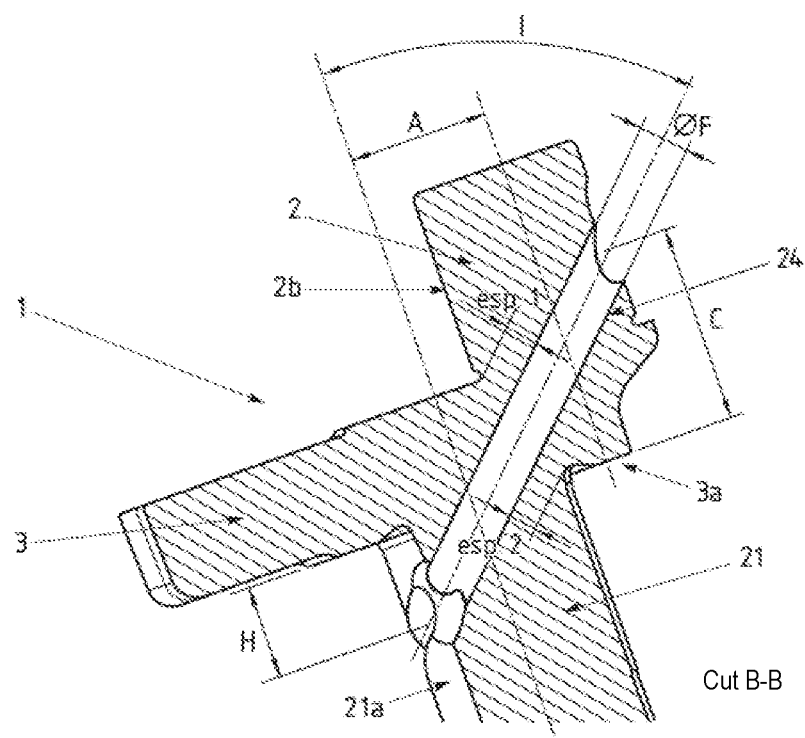
FIG. 5 illustrates a cut view, indicated in FIG. 4, of the end portion of a compressor shaft at which the eccentric pin in accordance with the preferred embodiment of the present invention is disposed.

FIGS. 4 and 5 shows a preferred embodiment of the crankshaft of the present invention, wherein FIG. 4 is a top view and FIG. 5 is a partial cut view of end portion of the crankshaft at which an eccentric pin is disposed.

As can be seen from these figures, crankshaft 1 of the present invention comprises a main shaft 21 connected to an eccentric pin 2 by means of a peripheral flange 3.

Nevertheless, it should be observed that the presence of this flange is not necessary, wherein in other embodiments of the present invention the main shaft can be directly connected to the eccentric pin. A construction of these types of shafts is well known from the state of the art, and the function thereof has been formerly commented.

To avoid problems and drawbacks associated with the solutions for holes of the state of the art, the crankshaft 1 of the present invention comprises a lubricating hole 24 whose end begins (or terminates, depending on the used machining technique) on the cylindrical surface 2b of pin 2, and terminates (or begins, depending on the used machining technique) on the cylindrical surface 21a of the body of main shaft 21, as can be seen from FIGS. 4 and 5.

A helical lubricating channel (not shown) is provided on the cylindrical surface 21a of main shaft 21. Said helical lubricating channel is known from those skilled in the art and, therefore, it will not be described in detail herein.

In the preferred embodiment shown in FIGS. 4 and 5, lubricating hole 24 comprises a centerline which is contained on a plane B-B, this latter being parallel to, but does not containing, a geometric axis coincident to the centerline of main shaft 21 and said plane (B-B) being angularly displaced an angle (B) relative to plane (P) defined by the centerlines of main shaft 21 and of eccentric pin 2 to minimize the maximum depth (E) of the inner surface of lubricating hole 24 relative to the cylindrical surface 21a of main shaft 21.

Therefore, by minimizing the maximum depth (E) (or maximizing the minimum radius (R1)), a lower restriction to the oil flowing from said main shaft 21 to eccentric pin 2 is obtained.

Hence, using a configuration such as the one of the present invention, a high degree of flexibility for the position of lubricating hole 24 is achieved, where a maximum radial depth (E)—values below 4.0 mm—can be obtained by correctly combining angles (B) and (D)—wherein (D) is the angle of the drilling starting position of lubricating hole 24 on the surface 2b of eccentric pin 2), when the dimensions given by eccentricity (A), diameter (F) of lubricating hole 24 and diameters of main shaft 21 and eccentric pin 2 of the crankshaft 1 are considered.

Figure 9:
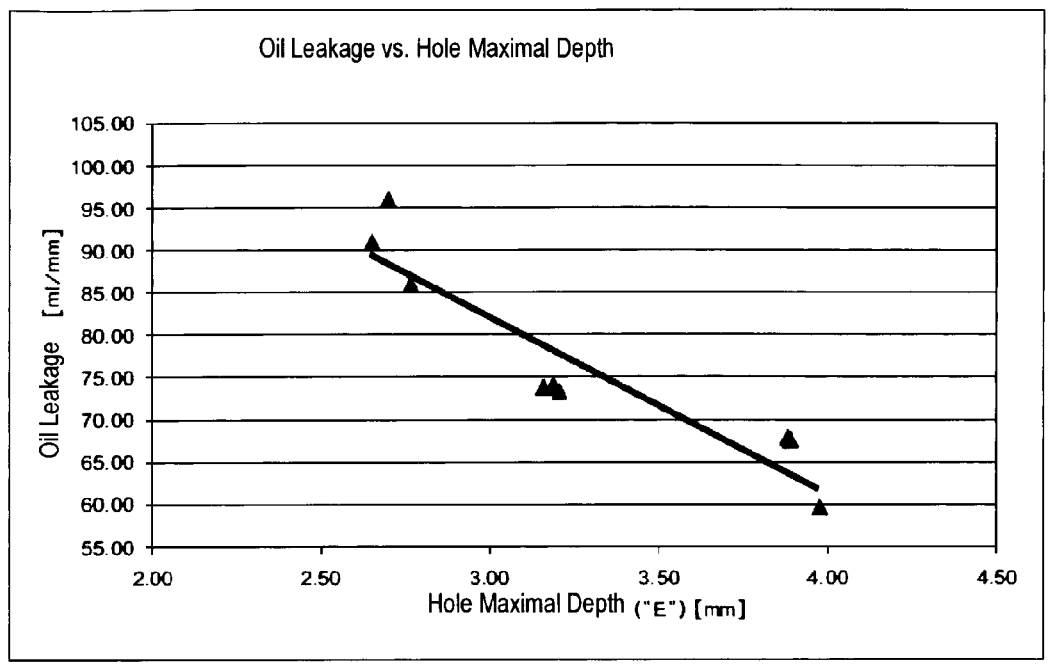
FIG. 9 illustrates a graph showing experimental results of oil flow rate measurements (pumping capacity) of a shaft, wherein the maximum radial depth (E) of lubricating hole 24 in relation to the shaft body surface has been varied.
Figure 10:
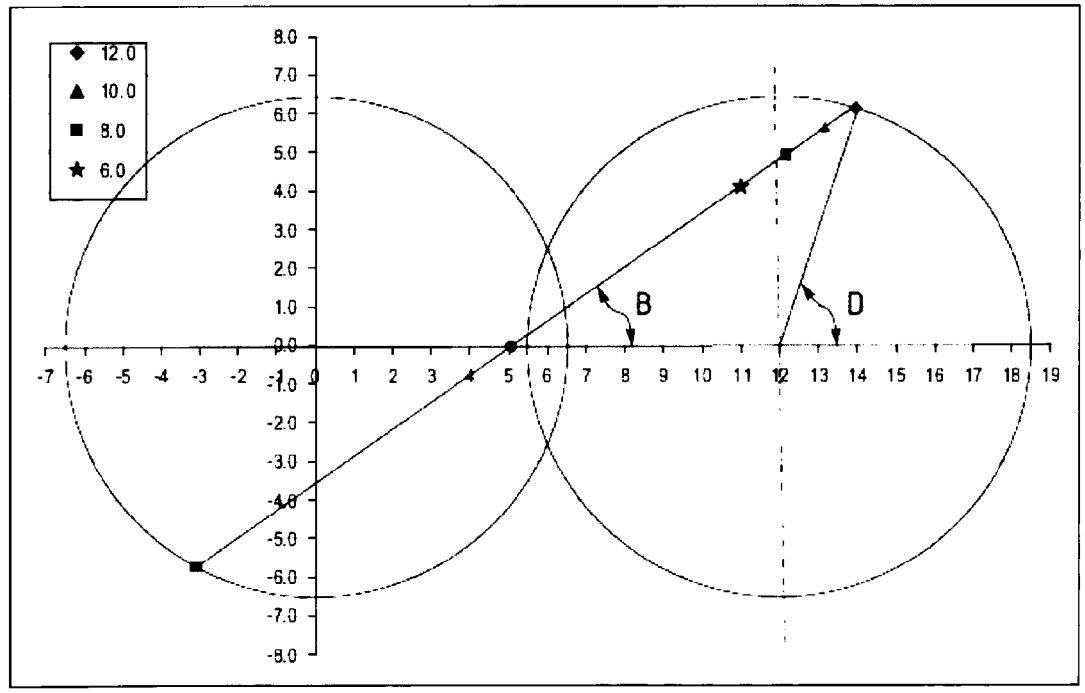
FIG. 10 illustrates a graph showing the result of a technical study for four different eccentricities of an eccentric pin, in which lubricating hole 24 was maintained fixed in relation to the body of the main shaft.

The benefit attained by increasing the minimum radius (R1) (or reducing the maximum radial depth (E) to the oil flow rate can be seen from FIG. 9, which shows inversely proportional ratio between reduction in the maximum radial depth (E) and increase in the oil flow rate.

In order to achieve a correct machining of the lubricating hole 24, in accordance with the preferred embodiment of the invention, the drilling tool must be introduced from with an angle (D) in relation to the center of the eccentric pin, and, in relation to the plane (B-B), the lubricating hole 24 has an inclination at angle (I) in relation to the centerline of the main shaft 21, wherein such angles (D and I) are defined by:
  the eccentricity (A) of the eccentric pin 2;
  the diameters of main shaft 21 and eccentric pin 2; and
  the axial distance between the beginning and end ("H" and "C" heights) of the hole on the surfaces of main shaft 21 and eccentric pin 2.

The beginning of the hole on the cylindrical surface 2b of eccentric pin 2 permits using angles (I) of about 45°, which, in combination with the angle (B), allows for said hole to be disposed in a region which ensures satisfactory wall thicknesses ("esp1" and "esp2" in FIG. 5, above 1.0 mm) even with the use of shafts having:
  diameter of main shaft and eccentric pin less than 14.0 mm;
  diameters (F) of hole of 2.5 mm or greater;
  eccentricities of 12.0 mm or greater;
  reduced thicknesses of the peripheral flange defining axial seat.

Upon analyzing the manufacture process required for machining said lubricating hole 24, taking into account that shafts having different eccentricities are produced in the same equipment, it is possible to simplify this process (time reduction in the preparation of machines or setup) by maintaining a fixed position of lubricating hole 24 in relation to the body of the main shaft 21 for a determined range of eccentricities (A).

Figure 8:
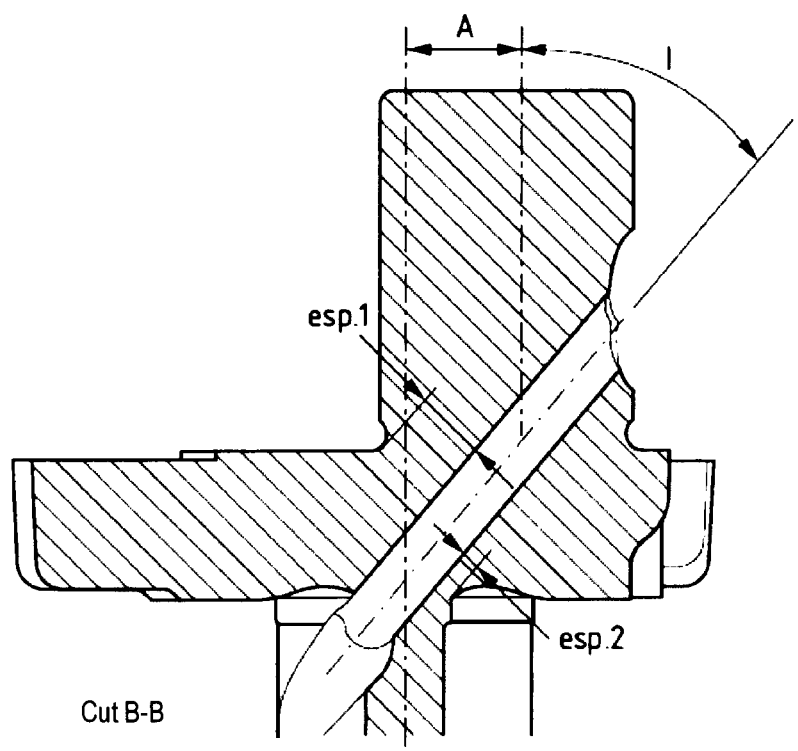
FIG. 8 illustrates a cut view, indicated in FIG. 7, of the end portion of a compressor crankshaft at which an eccentric pin in accordance with the alternative embodiment of the present invention is disposed.

As depicted in FIG. 4, by maintaining the angle (B) and minimum radius (R0) fixed, the starting position of lubricating hole 24 on the surface of eccentric pin 2b defined by angle (D), turns out to be variable with eccentricity (A). FIG. 8 shows this situation for different eccentricities (eccentricities 6, 8, 10 and 12 mm).

Figure 6:
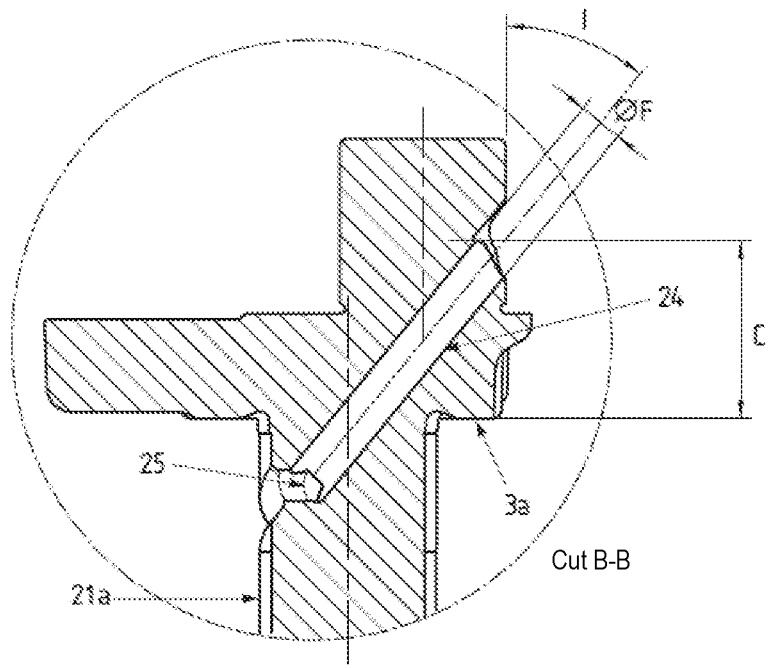
FIG. 6 illustrates a cut view of the end portion of a compressor shaft at which an eccentric pin in accordance with an alternative embodiment of the present invention is disposed.

FIG. 6 shows an alternative embodiment of the present invention, where lubricating hole 24 is not a hole that entirely passes through main shaft 21 of crankshaft 1. In this sense, FIG. 6 illustrates crankshaft in a cut view corresponding to cut B-B shown in the embodiment of FIG. 4.

In this case, it is used a complementary hole 25 interconnecting lubricating hole 24 with a helical channel on the surface of main shaft 21.

Said complementary hole 25 can be perpendicular to the surface of main shaft 21, as shown in FIG. 6, or can have any other type of suitable direction.

Figure 3:
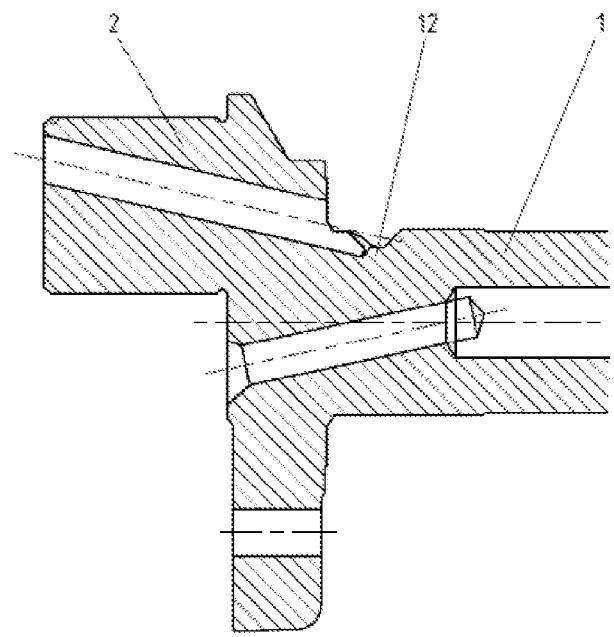
FIG. 3 illustrates a cut view of the end portion of another type of a conventional compressor crankshaft at which an eccentric pin is disposed, in accordance with the prior-art.
Figure 7:
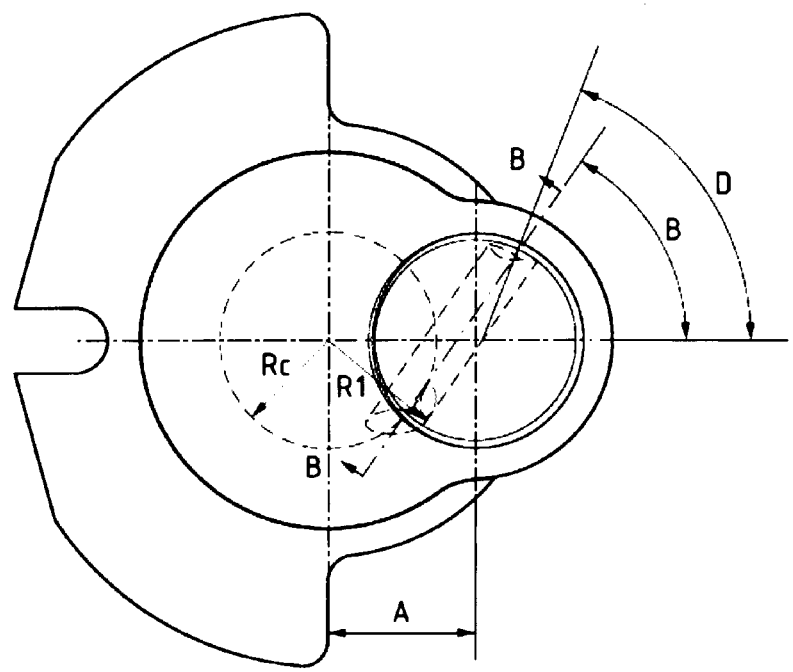
FIG. 7 illustrates a top view of a compressor crankshaft in accordance with an alternative embodiment of the present invention.

Additionally, in another alternative embodiment, as illustrated in FIGS. 7 and 8, lubricating hole 24 can totally or partially terminate on the axial surface 3a of peripheral flange 3 similarly to the termination of the lubricating hole 24 depicted in FIG. 3. Maximum depth (E) becomes zero because minimum radius (R1) is greater than radius (Rc) of the body of main shaft 21, and, consequently, there will be no more need to ensure a minimum thickness (esp.2).

For this particular configuration in which lubricating hole 24 partially reaches the main shaft body, said lubricating hole 24 is no longer completely formed in this region and then it passes to form a (semi-cylindrical) channel over the cylindrical surface 21a of the body of main shaft 21, which can be directly connected to a helical lubricating channel normally disposed at said shafts.

Additionally, the present invention is not only applicable to crankshafts with eccentric pin axially disposed at one of the ends of the main body, wherein it can also be used in crankshafts at which an eccentric pin is disposed between two main bearings of a crankshaft.

The present invention allows for a high degree of flexibility on the design of a hole of a compressor crankshaft, the present invention permitting:
  to increase the thicknesses ("esp.1" and "esp.2") of the shaft wall thus ensuring a maximum radial depth (E) suitable for the oil pumping process; and
  to dispose the beginning and the end of the hole in a region outside the bearing load region (region where are produced the higher pressures of the lubricating film during hydrodynamic regime);
  to simplify the machining process (reduction in the time of machining preparation or setup), whereby a fixed position of lubricating hole 24 in relation to the body of shaft 21 for a determined range of eccentricities (A) is maintained.

In fact, the present invention provides for the use of crankshafts having extremely low diameters (and, consequently, having low viscous loss) even with high eccentricities (12.0 mm or above) thereby maintaining an excellent capacity of oil pumping, mechanical strength and being easy to fabricate.

It should be understood that the description provided based on the figures above only refers to possible embodiments for the crankshaft of the present invention, where the true scope of the object of the present invention is defined by the appended claims.

The invention claimed is:

1. A reciprocating compressor having a centrifugal oil pump, the reciprocating compressor comprising:
  a crankshaft comprising a main shaft connected to an eccentric pin and a lubricating hole extending linearly from a cylindrical surface of the eccentric pin to a cylindrical surface of a body of the main shaft, wherein the lubricating hole comprises a centerline contained on a plane (B-B), the plane (B-B) being parallel to, but not containing, a geometrical axis coincident with a centerline of the main shaft and the plane (B-B) being angularly displaced by an angle (B) relative to another plane (P) defined by the center-line of the main shaft and a centerline of the eccentric pin ensuring a radial depth (E) at or below 4.0 mm, wherein the radial depth (E) is measured from an inner surface of the lubricating hole relative to the cylindrical surface of the body of the main shaft, and wherein the main shaft is directly connected to the eccentric pin by a peripheral flange.

2. The reciprocating compressor, in accordance with claim 1, wherein the lubricating hole further comprises minimum wall thicknesses ("esp.1" and "esp.2") of 1.00 mm.

* * * * *